United States Patent
Pecinovsky et al.

(10) Patent No.: US 12,173,217 B2
(45) Date of Patent: *Dec. 24, 2024

(54) NONLINEAR OPTICAL CHROMOPHORES HAVING TETRAHYDROCARBAZOLE DONOR GROUPS, LYOTROPIC COMPOSITIONS CONTAINING THE SAME, AND METHODS OF POLING SUCH COMPOSITIONS

(71) Applicant: Lightwave Logic, Inc., Englewood, CO (US)

(72) Inventors: Cory Pecinovsky, Lafayette, CO (US); Barry Johnson, Castle Rock, CO (US); Ginelle A. Ramann, Centennial, CO (US)

(73) Assignee: Lightwave Logic, Inc., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/437,967

(22) Filed: Feb. 9, 2024

(65) Prior Publication Data

US 2024/0247192 A1 Jul. 25, 2024

Related U.S. Application Data

(63) Continuation of application No. 18/078,337, filed on Dec. 9, 2022, now Pat. No. 11,976,232.

(60) Provisional application No. 63/288,089, filed on Dec. 10, 2021.

(51) Int. Cl.
  *G02F 1/1333* (2006.01)
  *C09K 19/34* (2006.01)
  *C09K 19/40* (2006.01)

(52) U.S. Cl.
  CPC ........ *C09K 19/406* (2013.01); *C09K 19/3405* (2013.01); *C09K 19/3477* (2013.01)

(58) Field of Classification Search
  CPC .............. C09K 19/406; C09K 19/3402; C09K 19/3405; C09K 19/3408; C09K 19/3441; C09K 19/3477; C09K 2019/0444; C09K 2019/0448; G02F 1/1333; G02F 1/3612
  See application file for complete search history.

(56) References Cited

U.S. PATENT DOCUMENTS

| | | |
|---|---|---|
| 4,767,169 A | 8/1988 | Teng et al. |
| 4,795,664 A | 1/1989 | DeMartino |
| 4,810,338 A | 3/1989 | DeMartino et al. |
| 4,936,645 A | 6/1990 | Yoon et al. |
| 5,006,285 A | 4/1991 | Thackara et al. |
| 5,044,725 A | 9/1991 | DeMartino et al. |
| 5,106,211 A | 4/1992 | Chiang et al. |
| 5,133,037 A | 7/1992 | Yoon et al. |
| 5,170,461 A | 12/1992 | Yoon et al. |
| 5,187,234 A | 2/1993 | Leslie et al. |
| 5,196,509 A | 3/1993 | Allen |
| 5,247,042 A | 9/1993 | Allen et al. |
| 5,326,661 A | 7/1994 | Sansone et al. |
| 5,670,091 A | 9/1997 | Marder et al. |
| 5,679,763 A | 10/1997 | Jen et al. |
| 6,090,332 A | 7/2000 | Marder et al. |
| 6,393,190 B1 | 5/2002 | He et al. |
| 6,444,830 B1 | 9/2002 | He et al. |
| 6,448,416 B1 | 9/2002 | He et al. |
| 6,514,434 B1 | 2/2003 | He et al. |
| 6,584,266 B1 | 6/2003 | He et al. |
| 6,716,995 B2 | 4/2004 | Huang et al. |
| 11,976,232 B2 * | 5/2024 | Pecinovsky ........ C09K 19/3405 |
| 2007/0260062 A1 | 11/2007 | Goetz et al. |
| 2007/0260063 A1 | 11/2007 | Goetz et al. |
| 2008/0009620 A1 | 1/2008 | Goetz et al. |
| 2008/0139812 A1 | 6/2008 | Goetz et al. |
| 2009/0005561 A1 | 1/2009 | Goetz et al. |
| 2012/0267583 A1 | 10/2012 | Goetz et al. |
| 2020/0183245 A1 | 6/2020 | Yi et al. |
| 2021/0405504 A1 | 12/2021 | Pecinovsky et al. |
| 2023/0183575 A1 | 6/2023 | Pecinovsky et al. |
| 2024/0247192 A1* | 7/2024 | Pecinovsky ........ C09K 19/3477 |

FOREIGN PATENT DOCUMENTS

| | | |
|---|---|---|
| WO | 0009613 A2 | 2/2000 |
| WO | 2021263164 A1 | 12/2021 |

OTHER PUBLICATIONS

Chia-Chi Teng, Measuring Electro-Optic Constants of a Poled Film, in Nonlinear Optics of Organic Molecules and Polymers, Chp. 7, 447-49 (Hari Singh Nalwa & Seizo Miyata eds., 1997).
C. W. Thiel, "For-wave Mixing and Its Applications," www.physics.montana.edu.students.thiel.docs/FWMixing.pdf; (2008).
U.S. Appl. No. 63/264,880, filed Dec. 21, 2021, Applicant: Lightwave Logic, Inc., "Non-Linear Optical Materials Containing High Boiling Point Solvents, and Methods of Efficiently Poling the Same".

* cited by examiner

*Primary Examiner* — Geraldina Visconti

(74) *Attorney, Agent, or Firm* — Flaster Greenberg P.C.

(57) ABSTRACT

Nonlinear optical chromophore compositions which display lyotropic nematic liquid crystal phases in polar organic solvents and provide a mechanical anisotropic effect allowing for the formation of a non-centrosymmetric chromophore-polymer matrix without the application of an electric field.

14 Claims, 4 Drawing Sheets

NONLINEAR OPTICAL CHROMOPHORES HAVING TETRAHYDROCARBAZOLE DONOR GROUPS, LYOTROPIC COMPOSITIONS CONTAINING THE SAME, AND METHODS OF POLING SUCH COMPOSITIONS

CROSS-REFERENCE TO RELATED APPLICATIONS

This application is a continuation of U.S. Non-Provisional patent application Ser. No. 18/078,337, filed Dec. 9, 2022, which claims the benefit of U.S. Provisional Patent Application No. 63/288,089, filed Dec. 10, 2021, the entire contents of which are hereby incorporated herein by reference.

BACKGROUND OF THE INVENTION

Nonlinear optical (NLO) chromophores provide the electro-optic (EO) activity in poled, electro-optic polymer devices. Electro-optic polymers have been investigated for many years as an alternative to inorganic materials such as lithium niobate in electro-optic devices. Electro-optic devices may include, for example, external modulators for telecom, datacom, RF photonics, and optical interconnects and so forth. Polymeric electro-optic materials have demonstrated enormous potential for core application in a broad range of next-generation systems and devices, including electro-optic modulators, optical switches, phased array radar, satellite and fiber telecommunications, cable television (CATV), optical gyroscopes for application in aerial and missile guidance, electronic counter measure (ECM) systems, backplane interconnects for high-speed computation, ultraquick analog-to-digital conversion, land mine detection, radio frequency photonics, spatial light modulation and all-optical (light-switching-light) signal processing.

Many NLO molecules (chromophores) have been synthesized that exhibit high molecular electro-optic properties. The product of the molecular dipole moment ($\mu$) and hyperpolarizability ($\beta$) is often used as a measure of molecular electro-optic performance due to the dipole's involvement in material processing. See Dalton et al., "New Class of High Hyperpolarizability Organic Chromophores and Process for Synthesizing the Same", WO 00/09613.

Nevertheless, extreme difficulties have been encountered translating microscopic molecular hyperpolarizabilities ($\beta$) into macroscopic material hyperpolarizabilities ($\chi^2$). Molecular subcomponents (chromophores) must be integrated into NLO materials that exhibit (i) a high degree of macroscopic nonlinearity and (ii) sufficient temporal, thermal, chemical, and photochemical stability. High electro-optic activity and the stability of electro-optic activity, which is also referred to as "temporal stability," are important for commercially viable devices. Electro-optic activity may be increased in electro-optic polymers by increasing the concentration of nonlinear optical chromophores in a host polymer and by increasing of the electro-optic property of chromophores. However, some techniques for increasing chromophore concentration may decrease poling efficiency and temporal stability. Simultaneous solution of these dual issues is regarded as the final impediment in the broad commercialization of EO polymers in numerous devices and systems.

The production of high material hyperpolarizabilities ($\chi^2$) is limited by the poor social character of NLO chromophores. Commercially viable materials must incorporate chromophores at large molecular densities with the requisite molecular moment statistically oriented along a single material axis. In order to achieve such an organization, the charge transfer (dipole) character of NLO chromophores is commonly exploited through the application of an external electric field during material processing that creates a localized lower-energy condition favoring noncentrosymmetric order. Unfortunately, even at moderate chromophore densities, molecules form multi-molecular dipolarly-bound (centrosymmetric) aggregates that cannot be dismantled via realistic field energies. To overcome this difficulty, integration of anti-social dipolar chromophores into a cooperative material architecture is commonly achieved through the construction of physical barriers (e.g., anti-packing steric groups) that limit proximal intermolecular relations.

Thus, it has often been considered advantageous in the art to produce nonlinear optical chromophore containing materials that exhibit a high glass transition temperature (Tg). Materials with a high glass transition temperature exhibit improved thermal stability and maintain their macroscopic electro-optic properties to a greater degree than materials with lower glass transition temperatures. However, materials with such elevated glass transition temperatures require significantly increased temperatures during poling processes to achieve adequate alignment. The necessity of employing such elevated temperatures is costly, time-consuming and results in poling inefficiency.

BRIEF SUMMARY OF THE INVENTION

The present invention is directed, in general, to nonlinear optical chromophores which form lyotropic mixtures in a solvent and exhibit liquid crystalline properties. Various embodiments of the present invention can thus provide improved poling efficiency.

Various embodiments of the invention exhibit liquid crystalline properties and form lyotropic compositions when mixed with a solvent. For example, in certain embodiments, the chromophores display lyotropic nematic liquid crystal phases in polar organic solvents. Resulting liquid crystalline properties provide a mechanical anisotropic effect allowing for the formation of a non-centrosymmetric chromophore-polymer matrix without the application of an electric field. In accordance with various embodiments described herein, a sufficient electro-optic coefficient ($r_{33}$) can be induced mechanically, alleviating the need for the application of poling temperature and electric field, typically 170° C. & 100 v/pm. The liquid crystalline properties and the lyotropic compositions allow for milder processing conditions and, thus, higher poling efficiency Various embodiments according to the present invention include a nonlinear optical chromophore of the general formula (I):

$$D-\Pi-A \qquad (I)$$

wherein D represents an organic electron-donating group; A represents an organic electron-accepting group having an electron affinity greater than the electron affinity of D; and Π represents a Π-bridge between A and D; wherein the electron-donating group D comprises a tetrahydrocarbazole moiety bound to the Π-bridge at a carbon atom in the tetrahydro six-membered carbon ring of the tetrahydrocarbazole moiety, and wherein the hydrogen bound to the nitrogen of the five-membered ring of the carbazole moiety is replaced with a substituent R.

Various embodiments according to the present invention include a lyotropic composition comprising a nonlinear optical chromophore of the general formula (I) and a solvent.

Various embodiments according to the present invention include a thin film formed from a composition as disclosed herein. Various embodiments according to the present invention include an electro-optic device including a thin film as disclosed herein.

Other aspects, features and advantages will be apparent from the following disclosure, including the detailed description, preferred embodiments, and the appended claims.

BRIEF DESCRIPTION OF SEVERAL VIEWS OF THE DRAWINGS

The foregoing summary, as well as the following detailed description of preferred embodiments of the invention, will be better understood when read in conjunction with the appended drawings. For purposes of illustration the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
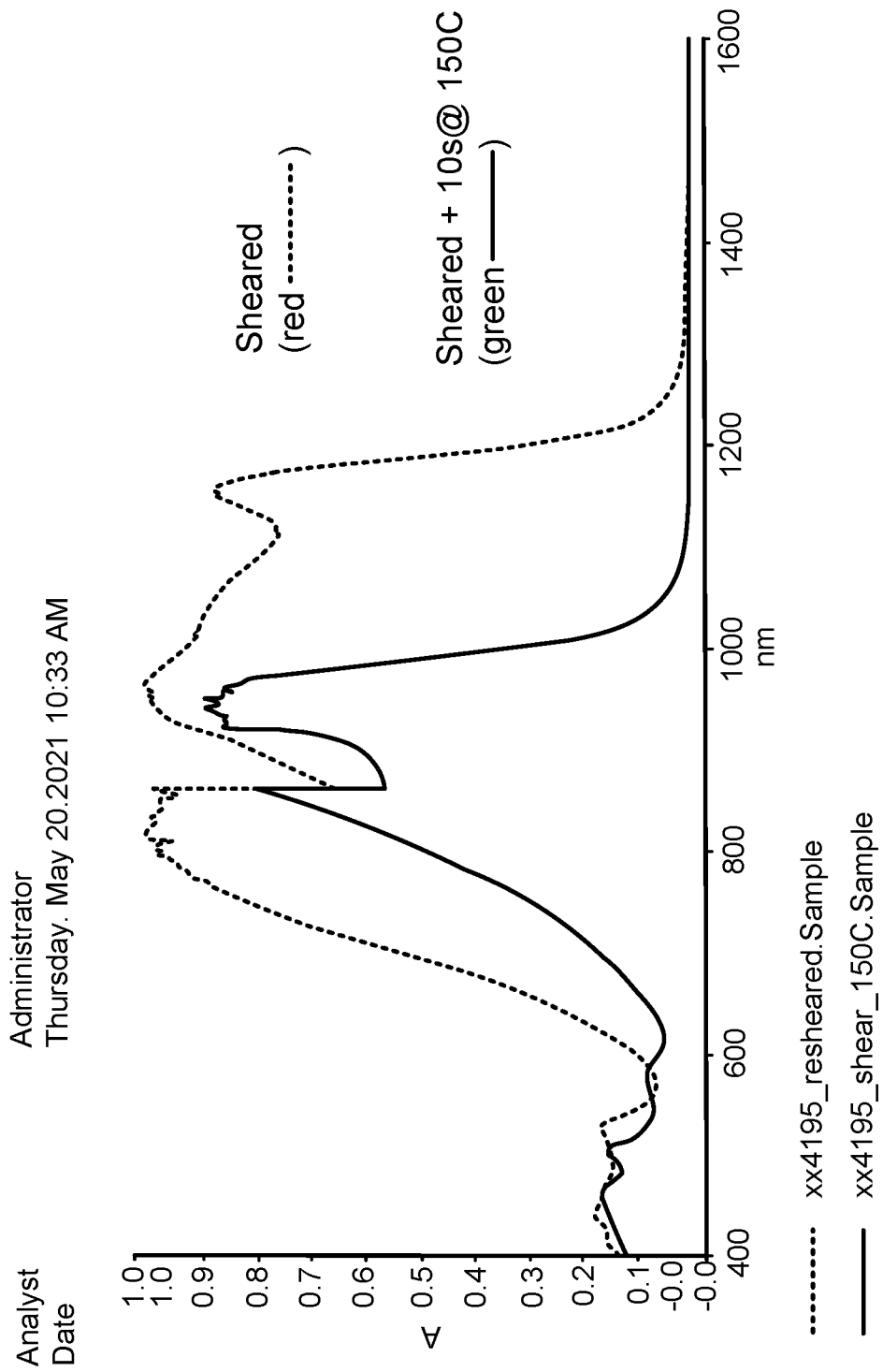
FIG. 1 is a graphical representation of light absorption of a chromophore in accordance with an embodiment of the invention in lyotropic phase and after solvent removal.

As used herein, the singular terms "a" and "the" are synonymous and used interchangeably with "one or more" and "at least one," unless the language and/or context clearly indicates otherwise. Accordingly, for example, reference to "a solvent" or "the solvent" herein or in the appended claims can refer to a single solvent or more than one solvent or mixture thereof. As a further example, and not limited to only electron-donating groups, reference to "an electron-donating group" or "the electron-donating group" herein or in the appended claims can refer to a single electron-donating group or more than on electron-donating group (e.g., "D" in any molecular formula herein may represent two or more electron-donating groups both bound to the Π-bridge). Additionally, all numerical values, unless otherwise specifically noted, are understood to be modified by the word "about."

As used herein, the term "nonlinear optical chromophore" (NLOC) refers to molecules or portions of a molecule that create a nonlinear optic effect when irradiated with light. The chromophores are any molecular unit whose interaction with light gives rise to the nonlinear optical effect. The desired effect may occur at resonant or nonresonant wavelengths. The activity of a specific chromophore in a nonlinear optic material is stated as its hyper-polarizability, which is directly related to the molecular dipole moment of the chromophore. The various embodiments of NLO chromophores of the present invention are useful structures for the production of NLO effects.

Nonlinear optical chromophores in accordance with various embodiments of the invention exhibit liquid crystalline properties and form lyotropic compositions when mixed with a solvent. Nonlinear optical chromophores in accordance with various embodiments of the invention exhibit high glass transition temperatures and self-alignment forming J-aggregates when combined with solvents to form lyotropic compositions, as opposed to head-to-tail alignment exhibited in the art (i.e., H-aggregates). Nonlinear optical chromophores in accordance with various embodiments of the invention can be combined neat (i.e., without any addition of a matrix material or host polymer) with a solvent to form a lyotropic composition which provides at least partial self-alignment of the chromophores with additional shear to form a highly ordered and densely packed state. In various embodiments, no further poling is required to provide a nonlinear optical thin film suitable for use in electro-optic devices, such as modulators. In various embodiments, the solvent can be removed under controlled conditions to maintain the chromophore in the highly ordered and densely packed state. In various embodiments, traditional poling processes including application of a field across the chromophore thin film can also be carried out. Nonlinear optical chromophores in accordance with various embodiments of the invention can also be combined with a matrix material or host polymer and a solvent to form a lyotropic composition. In various embodiments, a high boiling point solvent can be used for poling, such as in accordance with the processes described in provisional U.S. Pat. App. No. 63/264,880, filed on Dec. 3, 2021, the entire contents of which are incorporated herein by reference.

The first-order hyperpolarizability ($\beta$) is one of the most common and useful NLO properties. Higher-order hyperpolarizabilities are useful in other applications such as all-optical (light-switching-light) applications. To determine if a material, such as a compound or polymer, includes a nonlinear optic chromophore with first-order hyperpolar character and a sufficient electro-optic coefficient ($r_{33}$), which is a function of $\beta$, the following test may be performed. First, the material in the form of a thin film is placed in an electric field to align the dipoles. This may be performed by sandwiching a film of the material between electrodes, such as indium tin oxide (ITO) substrates, gold films, or silver films, for example.

To generate a poling electric field, an electric potential is then applied to the electrodes while the material is heated to near its glass transition ($T_g$) temperature. After a suitable period of time, the temperature is gradually lowered while maintaining the poling electric field. Alternatively, the material can be poled by corona poling method, where an electrically charged needle at a suitable distance from the material film provides the poling electric field. In either instance, the dipoles in the material tend to align with the field.

The nonlinear optical property of the poled material is then tested as follows. Polarized light, often from a laser, is passed through the poled material, then through a polarizing filter, and to a light intensity detector. If the intensity of light received at the detector changes as the electric potential applied to the electrodes is varied, the material incorporates a nonlinear optic chromophore and has an electro-optically variable refractive index. A more detailed discussion of techniques to measure the electro-optic constants of a poled film that incorporates nonlinear optic chromophores may be found in Chia-Chi Teng, Measuring Electro-Optic Constants of a Poled Film, in Nonlinear Optics of Organic Molecules and Polymers, Chp. 7, 447-49 (Hari Singh Nalwa & Seizo Miyata eds., 1997), incorporated by reference in its entirety, except that in the event of any inconsistent disclosure or definition from the present application, the disclosure or definition herein shall be deemed to prevail.

The relationship between the change in applied electric potential versus the change in the refractive index of the material may be represented as its EO coefficient $r_{33}$. This effect is commonly referred to as an electro-optic, or EO, effect. Devices that include materials that change their refractive index in response to changes in an applied electric potential are called electro-optical (EO) devices.

The second-order hyperpolarizability ($\gamma$) or third-order susceptibility ($\chi^{(3)}$), are the normal measures of third-order NLO activity. While there are several methods used to measure these properties, degenerate four-wave mixing (DFWM) is very common. See C. W. Thiel, "For-wave Mixing and Its Applications,"www.physics.montana.edu.students.thiel.docs/FWMixing.pdf, the entire contents of which are hereby incorporated herein by reference. Referring to Published U.S. Patent Application No. US 2012/0267583A1, the entire contents of which are incorporated herein by reference, a method of evaluating third-order NLO properties of thin films, known in the art as Degenerate Four Wave Mixing (DFWM), can be used. In FIG. 4 of US 2012/0267583A1, Beams 1 and 2 are picosecond, coherent pulses, absorbed by the NLO film deposited on a glass substrate. Beam 3 is a weaker, slightly delayed beam at the same wavelength as Beams 1 and 2. Beam 4 is the resulting product of the wave mixing, diffracted off of the transient holographic grating, produced by interferences of beams 1 and 2 in the NLO material of the film. Beam 3 can be a "control" beam at a telecom wavelength which produces a "signal" beam at a frequency not absorbed by the NLO material.

Nonlinear optical chromophores in accordance with the various embodiments of the invention have the general formula (I):

$$D-\Pi-A \qquad (I)$$

wherein D represents an organic electron-donating group; A represents an organic electron-accepting group having an electron affinity greater than the electron affinity of D; and Π represents a Π-bridge between A and D. The terms electron-donating group (donor or "D"), Π-bridge (bridging group or "Π"), and electron-accepting group (acceptor or "A"), and general synthetic methods for forming D-Π-A chromophores are known in the art, for example as described in U.S. Pat. Nos. 5,670,091, 5,679,763, 6,090,332, and 6,716,995, and U.S. patent application Ser. No. 17/358,960, filed on Jun. 25, 2021, the entire contents of each of which is incorporated herein by reference.

An acceptor is an atom or group of atoms that has a low reduction potential, wherein the atom or group of atoms can accept electrons from a donor through a Π-bridge. The acceptor (A) has a higher electron affinity that does the donor (D), so that, at least in the absence of an external electric field, the chromophore is generally polarized in the ground state, with relatively more electron density on the acceptor (D). Typically, an acceptor group contains at least one electronegative heteroatom that is part of a pi bond (a double or triple bond) such that a resonance structure can be drawn that moves the electron pair of the pi bond to the heteroatom and concomitantly decreases the multiplicity of the pi bond (i.e., a double bond is formally converted to single bond or a triple bond is formally converted to a double bond) so that the heteroatom gains formal negative charge. The heteroatom may be part of a heterocyclic ring. Exemplary acceptor groups include but are not limited to —$NO_2$, —CN, —CHO, COR, $CO_2R$, —$PO(OR)_3$, —SOR, —$SO_2R$, and —$SO_3R$ where R is alkyl, aryl, or heteroaryl. The total number of heteroatoms and carbons in an acceptor group is about 30, and the acceptor group may be substituted further with alkyl, aryl, and/or heteroaryl.

Suitable electron-accepting groups "A" (also referred to in the literature as electron-withdrawing groups) for nonlinear optical chromophores in accordance with the various embodiments of the present invention include those described in published U.S. Patent Applications: US 2007/0260062; US 2007/0260063; US 2008/0009620; US 2008/0139812; US 2009/0005561; US 2012/0267583A1 (collectively referred to as "the prior publications"), each of which is incorporated herein by reference in its entirety; and in U.S. Pat. Nos. 6,584,266; 6,393,190; 6,448,416; 6,44,830; 6,514, 434; 5,044,725; 4,795,664; 5,247,042; 5,196,509; 4,810, 338; 4,936,645; 4,767,169; 5,326,661; 5,187,234; 5,170, 461; 5,133,037; 5,106,211; and 5,006,285; and U.S. patent application Ser. No. 17/358,960, filed on Jun. 25, 2021; each of which is also incorporated herein by reference in its entirety.

In various nonlinear optical chromophores in accordance with various preferred embodiments of the present invention, suitable electron-accepting groups include those according to general formula ($I^a$):

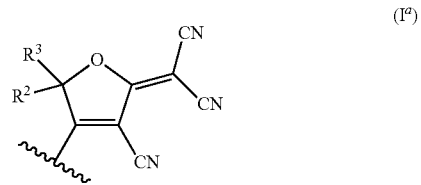

wherein $R^2$ and $R^3$ each independently represents a moiety selected from the group consisting of H, substituted or unsubstituted $C_1$-$C_{10}$ alkyl, substituted or unsubstituted $C_2$-$C_{10}$ alkenyl, substituted or unsubstituted $C_2$-$C_{10}$ alkynyl, substituted or unsubstituted aryl, substituted or unsubstituted alkylaryl, substituted or unsubstituted carbocyclic, substituted or unsubstituted heterocyclic, substituted or unsubstituted cyclohexyl, and $(CH_2)_n$—O—$(CH_2)_n$ where n is 1-10. As used herein, ↗ represents a point of bonding to another portion of a larger molecular structure. In various preferred embodiments, one or both of $R^2$ and $R^3$ represent a halogen-substituted moiety. Halogen-substituted may refer to mono-, di-, tri- and higher degrees of substitution. In various preferred embodiments, one of $R^2$ and $R^3$ represent a halogen-substituted alkyl moiety and the other represents an aromatic moiety. In various preferred embodiments, one of $R^2$ and $R^3$ represent a halogen-substituted aromatic moiety and the other represents an alkyl moiety. In various preferred embodiments, the electron-accepting group can be

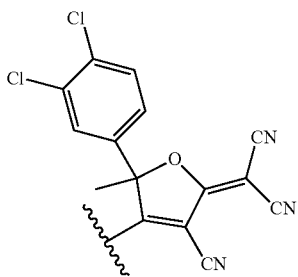 [SMILES: *C1=C(C#N)C(=C(C#N)C#N)OC1(C)c1ccc(Cl)c(Cl)c1]

In various preferred embodiments, the electron-accepting group can be

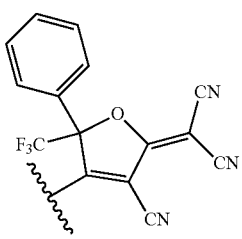 [SMILES: *C1=C(C#N)C(=C(C#N)C#N)OC1(c1ccccc1)C(F)(F)F]

In various preferred embodiments, the electron-accepting group can be

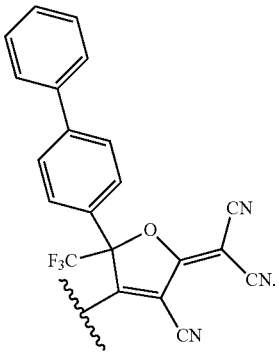 [SMILES: *C1=C(C#N)C(=C(C#N)C#N)OC1(c1ccc(-c2ccccc2)cc1)C(F)(F)F]

A donor includes an atom or group of atoms that has a low oxidation potential, wherein the atom or group of atoms can donate electrons to an acceptor "A" through a Π-bridge. The donor (D) has a lower electron affinity than does the acceptor (A), so that, at least in the absence of an external electric field, the chromophore is generally polarized, with relatively less electron density on the donor (D).

A donor in accordance with various embodiments of the present invention can include a tetrahydrocarbazole moiety represented by the general formula (II):

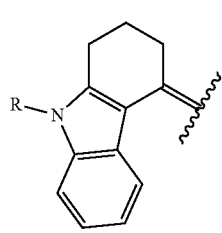

(II)

wherein $R^1$ represents a moiety other than hydrogen, wherein $R^2$ represents a moiety selected from hydrogen, halides, alkoxy groups, alkyl groups (branched or unbranched), and aryl groups, wherein $R^3$ represents a moiety selected from hydrogen and alkyl groups (branched or unbranched), wherein $R^4$ represents a moiety selected from hydrogen and alkyl groups (branched or unbranched), and wherein $R^5$ which may optionally be present represents a fused aliphatic or aromatic ring having 3 to 5 carbon atoms. In various embodiments, $R^3$ and $R^4$ can represent the same moiety. In various embodiments $R^1$ represents a moiety selected from the group consisting of branched alkyl groups, and aryl groups. In various embodiments, $R^1$ represents a moiety selected from substituted and unsubstituted benzyl groups.

A donor in accordance with various embodiments of the present invention can include a tetrahydrocarbazole moiety represented by the general formula (IIa):

(IIa)

wherein R represents a moiety other than hydrogen.

In various embodiments, a donor can include a tetrahydrocarbazole moiety represented by the general formula (II), wherein $R^1$ represents an aryl-containing moiety. In various embodiments, $R^1$ can represent an aryl group further substituted with a silyl group. In various embodiments, $R^1$ can represent an aryl group further substituted with a triaryl-substituted silyl group. In various embodiments, $R^1$ can represents 4-(triphenylsilyl)-phenylmethyl.

In various embodiments, a donor can include a tetrahydrocarbazole moiety represented by the general formula (IIa), wherein R represents an aryl-containing moiety. In various embodiments, R can represent an aryl group further substituted with a silyl group. In various embodiments, R can represent an aryl group further substituted with a triaryl-substituted silyl group. In various embodiments, R can represents 4-(triphenylsilyl)-phenylmethyl.

A "Π-bridge" includes an atom or group of atoms through which electrons may be delocalized from an electron donor (defined above) to an electron acceptor (defined above) through the orbitals of atoms in the bridge. Such groups are very well known in the art. Typically, the orbitals will be p-orbitals on double ($sp^2$) or triple (sp) bonded carbon atoms such as those found in alkenes, alkynes, neutral or charged aromatic rings, and neutral or charged heteroaromatic ring systems. Additionally, the orbitals may be p-orbitals on atoms such as boron or nitrogen. Additionally, the orbitals may be p, d or f organometallic orbitals or hybrid organometallic orbitals. The atoms of the bridge that contain the orbitals through which the electrons are delocalized are referred to here as the "critical atoms." The number of critical atoms in a bridge may be a number from 1 to about 30. The critical atoms may be substituted with an organic or inorganic group. The substituent may be selected with a view toward improving the solubility of the chromophore in a polymer matrix, enhancing the stability of the chromophore, or for other purposes.

Suitable bridging groups (II) for nonlinear optical chromophores according to general formula (I) of the present invention include those described in U.S. Pat. Nos. 6,584,266; 6,393,190; 6,448,416; 6,44,830; 6,514,434; and U.S. patent application Ser. No. 17/358,960, filed on Jun. 25, 2021; each of which is also incorporated herein by reference in its entirety.

In various preferred embodiments, bridging groups (I) for nonlinear optical chromophores according to general formula (I) of the present invention include those of the general formula ($II^a$):

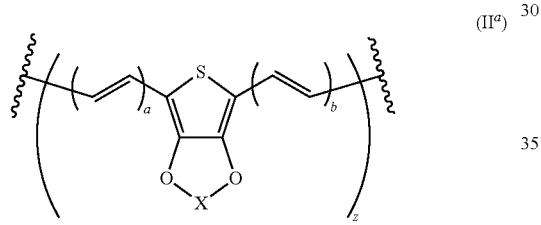

wherein X represents a substituted or unsubstituted, branched or unbranched $C_2$-$C_4$ diyl moiety; wherein each a and b independently represents an integer of 0 to 3; and z represents an integer of 1 to 3. In various embodiments wherein a or b in general formula ($II^a$) is 1, that carbon-carbon double bond in the formula can be replaced with a carbon-carbon triple bond. Alternatively, in various preferred embodiments, bridging groups (I) for nonlinear optical chromophores according to general formula (I) of the present invention include those of the general formula ($II^b$):

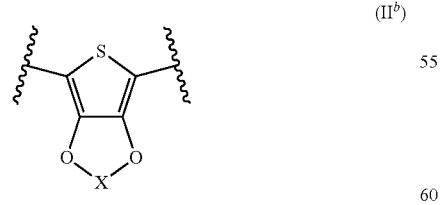

wherein X represents a substituted or unsubstituted, branched or unbranched $C_2$-$C_4$ diyl moiety. In various embodiments of the present invention wherein one or more diamondoid groups is covalently attached to a bridging group according to general formulae $II^a$ or $II^b$, the one or more diamondoid groups may be bound, for example, to the sulfur or oxygen atoms of the thiophene group or to one or mor carbon atoms in X through an ether or thioether linkage.

In various preferred embodiments, bridging groups (I) for nonlinear optical chromophores according to general formula (I) of the present invention include those of the general formula ($II^c$):

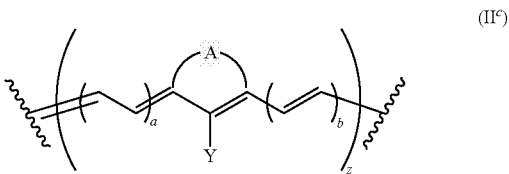

wherein each Y independently represents: a diamondoid-containing group covalently bound to the bridging group through any of the various linkages described herein below including but not limited to ether and thioether linkages; or each Y may represent a hydrogen, an alkyl group, aryl group, sulfur or oxygen linked akyl or aryl group, or a branched or unbranched, optionally heteroatom-containing $C_1$-$C_4$ substituent; wherein each a and b independently represents an integer of 0 to 3; z represents an integer of 1 to 3; and wherein each arc A independently represents a substituted or unsubstituted $C_2$-$C_4$ alkyl group, which together with the carbon bearing the Y substituent and its two adjacent carbon atoms forms a cyclic group. Substituted or unsubstituted $C_2$-$C_4$ alkyl groups which constitute arc A may include 1 to 4 hydrogen substituents each comprising a moiety selected from the group consisting of substituted or unsubstituted $C_1$-$C_{10}$ alkyl, substituted or unsubstituted $C_2$-$C_{10}$ alkenyl, substituted or unsubstituted $C_2$-$C_{10}$ alkynyl, substituted or unsubstituted aryl, substituted or unsubstituted alkylaryl, substituted or unsubstituted carbocyclic, substituted or unsubstituted heterocyclic, substituted or unsubstituted cyclohexyl, and $(CH_2)_n$—O—$(CH_2)_n$ where n is 1-10. In various preferred embodiments, z represents 1. In various embodiments according to the present invention, the electron-donating group or electron-accepting group can include one or more covalently bound diamondoid groups, and Y in general formula $II^c$ may represent any of the above substituents. In certain preferred embodiments, a chromophore may include an electron-donating group including one or more covalently linked diamondoid groups, preferably adamantyl, and the bridging group may include an isophorone group in accordance with general formula II wherein Y represent an aryl thioether substituent.

In various preferred embodiments, bridging groups (II) for nonlinear optical chromophores according to general formula (I) of the present invention include those of the general formula ($II^d$):

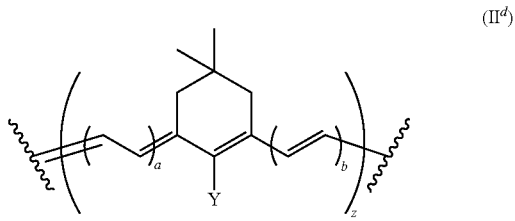

wherein each Y independently represents: a diamondoid-containing group covalently bound to the bridging group through any of the various linkages described herein below including but not limited to ether and thioether linkages; or each Y may represent a hydrogen, an alkyl group, aryl group, sulfur or oxygen linked alkyl or aryl group, an aryl group (optionally bearing a diamondoid group) linked directly by a carbon-carbon bond (e.g., adamantly anisole), a halogen, a halogenated alkyl group, a halogenated aryl group, or a branched or unbranched, optionally heteroatom-containing $C_1$-$C_4$ substituent; wherein each a and b independently represents an integer of 0 to 3; and z represents an integer of 1 to 3. In various embodiments according to the present invention, the electron-donating group or electron-accepting group can include one or more covalently bound diamondoid groups, and Y in general formula $II^d$ may represent any of the above substituents. In certain preferred embodiments, a chromophore may include an electron-donating group including one or more covalently linked diamondoid groups, preferably adamantyl, and the bridging group may include an isophorone group in accordance with general formula $II^d$ wherein Y represent an aryl thioether substituent. In various embodiments, each of the geminal methyl groups on the isophorone bridge of the general formula $II^d$ can instead independently represent a moiety selected from the group consisting of substituted or unsubstituted $C_1$-$C_{10}$ alkyl, substituted or unsubstituted $C_2$-$C_{10}$ alkenyl, substituted or unsubstituted $C_2$-$C_{10}$ alkynyl, substituted or unsubstituted aryl, substituted or unsubstituted alky-laryl, substituted or unsubstituted carbocyclic, substituted or unsubstituted heterocyclic, substituted or unsubstituted cyclohexyl, halogens, halogenated alkyl groups (e.g., —$CF_3$), halogenated aryls and heteroaryl groups (e.g., pentafluorothiophenol), and $(CH_2)_n$—O—$(CH_2)_n$ where n is 1-10.

For example, bridging groups (II) for nonlinear optical chromophores according to general formula (I) of the present invention can include:

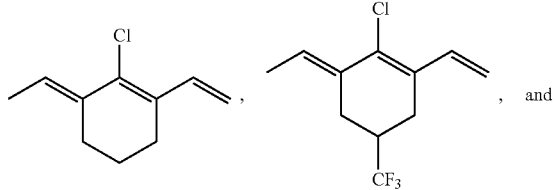
,            and

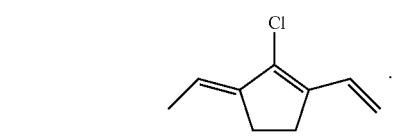

Examples of nonlinear optical chromophores according to various embodiments can include:

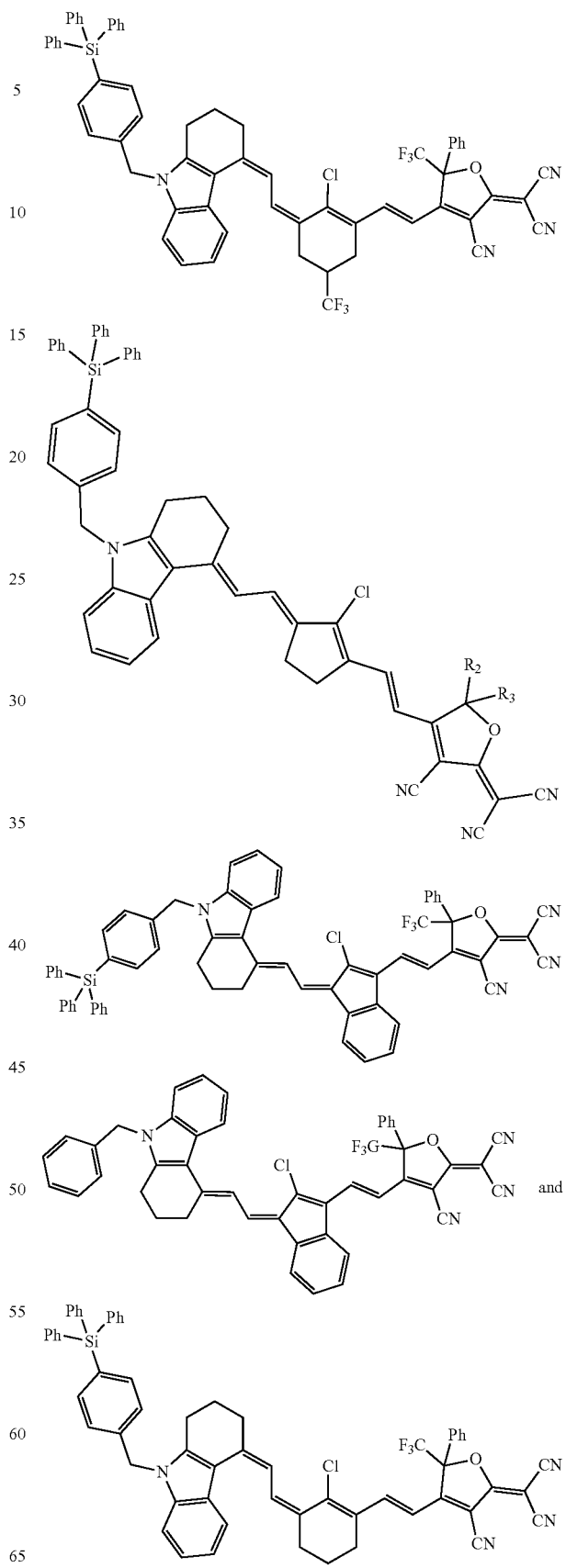

Various embodiments according to the present invention include lyotropic compositions comprising a nonlinear optical chromophore as disclosed herein and a solvent. Suitable solvents for lyotropic compositions in accordance with various embodiments can include an aprotic, polar solvent and mixtures thereof. In various embodiments, a suitable solvent can comprise propylene carbonate.

A suitable solvent(s) can be combined with a nonlinear optical chromophore in any amount. In various embodiments, one or more solvents can be combined with a nonlinear optical chromophore in an amount of up to from about 25 wt. % to about 75 wt. %, and in various embodiments, from about 35 wt. % to about 65 wt. %, and in various embodiments from about 40 wt. % to about 60 wt. %. In various embodiments, one or more solvents can be combined with a nonlinear optical chromophore in an amount of up to 50 wt. %.

Lyotropic compositions of a nonlinear optical chromophore and solvent in accordance with the various embodiments of the invention exhibit at least partial self-alignment. Such compositions can be efficiently poled with minimal application of voltage. In various embodiments, lyotropic compositions exhibit a high degree of self-alignment upon shearing such that poling with applied voltage is unnecessary. Lyotropic compositions in accordance with various embodiments of the invention can form dense, highly packed, highly ordered thin films for use in electro-optic devices. Thin films in accordance with various embodiments of the invention can be formed without externally applied voltage, or with applied voltage. In various embodiments, thin films are formed with no applied voltage.

The invention will now be described in further detail with reference to the following non-limiting example.

EXAMPLES

Synthesis Example 1

Step 1: Synthesis of triphenyl(p-tolyl)silane

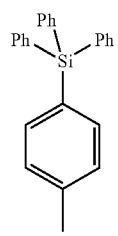 [SMILES: Cc1ccc([Si](c2ccccc2)(c2ccccc2)c2ccccc2)cc1]

A dry RB flask (1) was charged with 1-bromo-4-methyl-benzene (9.93 mL, 0.0807 mol) and THF (200 mL) then chilled to −78° C. in a dry ice/acetone bath. n-Butyllithium (2.50 mol/L, 32.3 mL, 0.0807 mol) was added at a rate so the temperature did not rise above −55° C. (5 mL increments), and the reaction was stirred under nitrogen at −78° C. for 2 hours.

Another RB flask (2) was evacuated then filled with nitrogen 3 times, charged with triphenylsilyl chloride (26.2 g, 0.0888 mol), evacuated/filled with nitrogen 3 times, and stirred at 60° C. under vacuum for 1H. The flask (2) was allowed to cool, filled with nitrogen, then charged with THF (100 mL) and chilled to −78° C.

The contents of flask 2 were cannulated into flask 1 at a steady drip, temperature increased 5° C. The reaction was stirred under nitrogen and allowed to slowly warm to room temperature.

The reaction was diluted with DCM, washed with water then brine, dried with MgSO$_4$ and evaporated giving a white solid. It was stirred in hexane for 1H, filtered/washed with hexane (500 mL).

Obtained triphenyl(p-tolyl)silane (25.4 g, 0.0725 mol, yield: 89.8%) as a white powder.

Step 2: Wohl-Ziegler bromination of triphenyl(p-tolyl)silane

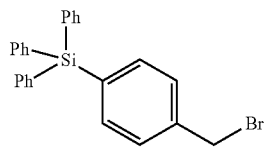 [SMILES: BrCc1ccc([Si](c2ccccc2)(c2ccccc2)c2ccccc2)cc1]

A RB flask was charged with the triphenyl(p-tolyl)silane (0 mmol/L, 0 mL, 0.0394 mol), N-Bromosuccinimide (7.36 g, 0.0413 mol), 400 mL of DCM, and 2-[(E)-(1-cyano-1-methyl-ethyl)azo]-2-methyl-propanenitrile (0.323 g, 0.00197 mol). The reaction was refluxed under nitrogen overnight. TLC indicated quantitative conversion to the bromide.

The reaction was washed with water then brine, dried with MgSO$_4$, and evaporated giving a tan powder. This was triturated in hexane and filtered giving 3343-A, 13.8 g, and the filtrate was evaporated giving 3343-H, 3.49 g. The hexane fraction was chromatographed, eluting with hexane/ethyl acetate (3-5%). The appropriate fractions were combined and evaporated giving 3343-frac-A-B. Fraction B was triturated in hexane and filtered giving 3343-B as a very white granular powder, 885 mg.

Obtained [4-(bromomethyl)phenyl]-triphenyl-silane (14.7 g, 0.0342 mol, yield: 87.0%).

Step 3: Alkylation of 1,2,3,9-tetrahydrocarbazol-4-one

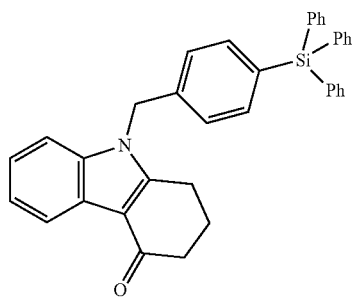 [SMILES: O=C1CCCc2c1c1ccccc1n2Cc1ccc([Si](c2ccccc2)(c2ccccc2)c2ccccc2)cc1]

A RB flask was charged with [4-(bromomethyl)phenyl]-triphenyl-silane (13.8 g, 0.0321 mol), 1,2,3,9-tetrahydrocarbazol-4-one (5.95 g, 0.0321 mol), and 200 mL DMF under nitrogen. The mixture was chilled to 0° C. then sodium hydride (60.0%, 1.41 g, 0.0353 mol) was added. The reaction was stirred under nitrogen, slowly warming to RT. At 2H the reaction had warmed up and it was homogeneous, about 15 minutes later the product crashed out and it stopped stirring. The reaction became a solid-looking white paste.

The reaction was triturated in water then filtered/washed with water. The organics were chromatographed, eluting with hexane/ethyl acetate (5%). The appropriate fractions were combined and evaporated giving an off white solid. It was dissolved in DCM, hexane was added and the DCM was evaporated off. The resulting solids were filtered.

Obtained 9-[(4-triphenylsilylphenyl)methyl]-2,3-dihydro-1H-carbazol-4-one (10.8 g, 0.0202 mol, yield: 63.0%) as a white solid.

Step 4: Alkylation of 9-[(4-triphenylsilylphenyl)methyl]-2,3-dihydro-1H-carbazol-4-one with methylmagnesium bromide

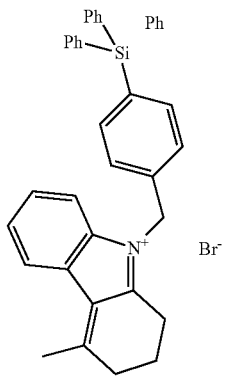

A dry RB flask was charged with 9-benzyl-2,3-dihydro-1H-carbazol-4-one (6.18 g, 0.0224 mol) and 240 mL THF under nitrogen. Bromo(methyl)magnesium (3.00 mol/L, 15.0 mL, 0.0449 mol) was added, and the reaction was stirred under nitrogen. After stirring over the weekend, the reaction was diluted with DCM, washed with water (Grignard evident on addition of water, acidified with HCl to eliminate emulsion), then brine, dried with $MgSO_4$, and evaporated. The material was chromatographed, eluting with hexane/ethyl acetate (5%). The appropriate fractions were combined and evaporated.

Obtained 9-benzyl-4-methyl-2,3-dihydro-1H-carbazol-9-ium; bromide (2.19 g, 0.00618 mol, yield: 27.5%).

Step 5: Reaction of donor, bridge and acceptor to form Chromophore 1. A RB flask was charged with (3E)-2-chloro-3-(hydroxymethylene)cyclohexene-1-carbaldehyde (0.403 g, 0.00233 mol), 2-[3-cyano-4-methyl-5-phenyl-5-(trifluoromethyl)-2-furylidene]propanedinitrile (0.736 g, 0.00233 mol), and 12 mL of methanol. It was stirred at 40° C. under nitrogen for 1 hour. The methanol was evaporated, then [4-[(4-methyl-2,3-dihydro-1H-carbazol-9-ium-9-yl)methyl]phenyl]-triphenyl-silane; bromide (1.43 g, 0.00233 mol) and 12 mL DCM were added. The reaction was stirred under nitrogen at room temperature overnight. The reaction was added to a silica gel column and eluted with DCM. The appropriate fractions were combined and evaporated, clean carbazolium was recovered, 3307-C, 391 mg. The residue with product was chromatographed eluting with DCM. The appropriate fractions were combined and evaporated giving 3307-P, 1.11 g. It was triturated in hot methanol, allowed to cool, filtered, and washed with methanol giving 3307-A, 0.752 g after drying. The methanol was evaporated giving 3307-MeOH.

Obtained Chromophore 1: 2-[4-[(E)-2-[(3Z)-2-chloro-3-[(2Z)-2-[9-[(4-triphenylsilylphenyl)methyl]-2,3-dihydro-1H-carbazol-4-ylidene]ethylidene]cyclohexen-1-yl]vinyl]-3-cyano-5-phenyl-5-(trifluoromethyl)-2-furylidene]propanedinitrile (1.11 g, 0.00113 mol, yield: 48.4%).

Chromophore 1

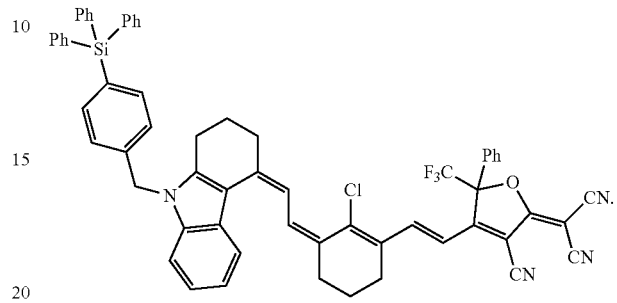

Synthesis Example 2

Using the donor group prepared in Synthesis Example 1, 9-benzyl-4-methyl-2,3-dihydro-1H-carbazol-9-ium; bromide, Chromophore 2 was prepared as follows. A RB flask was charged with (3E)-2-chloro-3-(hydroxymethylene)-5-(trifluoromethyl)cyclohexene-1-carbaldehyde (0.349 g, 0.00145 mol), 2-[3-cyano-4-methyl-5-phenyl-5-(trifluoromethyl)-2-furylidene]propanedinitrile (0.458 g, 0.00145 mol), and 12 mL of ethanol. It was stirred at 40° C. under nitrogen for 1 hour. The ethanol was evaporated, then [[4-[(4-methyl-2,3-dihydro-1H-carbazol-9-ium-9-yl)methyl]phenyl]-triphenyl-silane; bromide (809 mg, 0.00132 mol) and 12 mL DCM were added. The reaction was stirred under nitrogen at room temperature overnight. The reaction was added to a silica gel column and eluted with DCM. The appropriate fractions were combined and evaporated. The residue with product was chromatographed eluting with DCM. The appropriate fractions were combined and evaporated. This was triturated in hot methanol, allowed to cool, filtered, and washed with methanol.

Obtained 2-[4-[(E)-2-[(3Z)-2-chloro-5-(trifluoromethyl)-3-[(2Z)-2-[9-[(4-triphenylsilylphenyl)methyl]-2,3-dihydro-1H-carbazol-4-ylidene]ethylidene]cyclohexen-1-yl]vinyl]-3-cyano-5-phenyl-5-(trifluoromethyl)-2-furylidene]propanedinitrile (0.595 g, 0.000566 mol, yield: 42.9%).

Chromophore 2

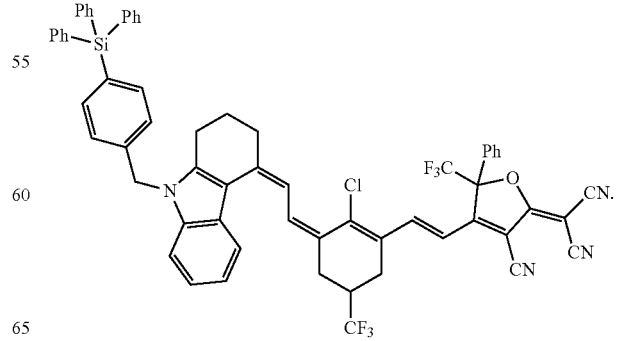

Examples of Maximal Absorption Wavelength for Chromophore Embodiments

Chromophore 1 was combined with propylene carbonate at 50% by weight forming a lyotropic composition. The composition was shear aligned between two glass substrates and subjected to light absorption analysis across the visible and near infrared spectrum. Referring to FIG. 1, a shear aligned sample (the curve with the absorption peak near 1200 nm) exhibited red-shift as shown by its peak values and overall shift in the near infrared direction. As also shown in FIG. 1, a shear aligned sample which was then heated to 150° C. for a brief period of time to remove solvent, did not exhibit such red-shift. Such red-shift is evidence of J-aggregate formation indicating at least partial self-alignment and anisotropy.

Figure 2A:
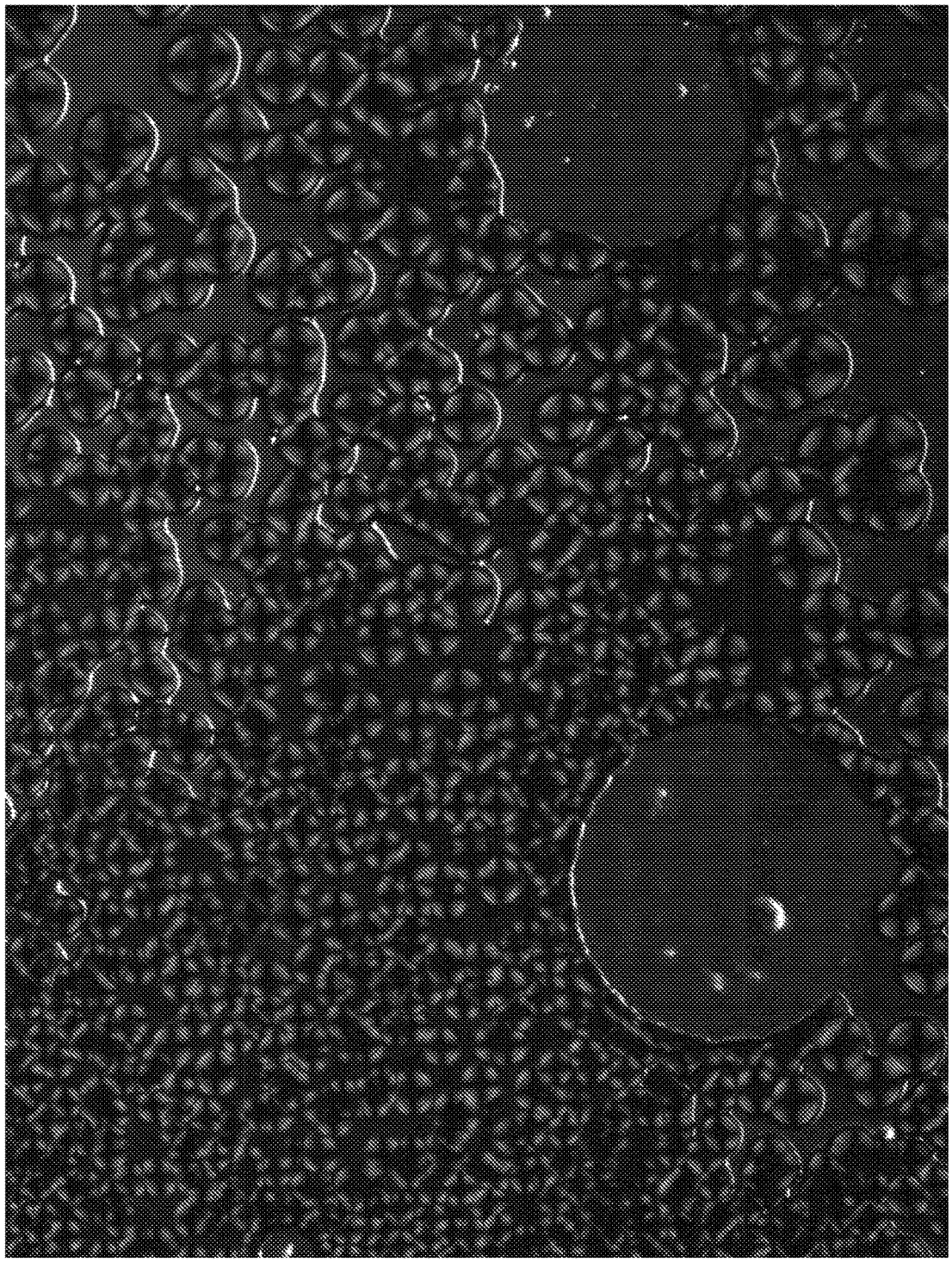
FIG. 2a is a polarized light microscopy image of a chromophore in accordance with an embodiment of the invention forming micelles in solvent.
Figure 2B:
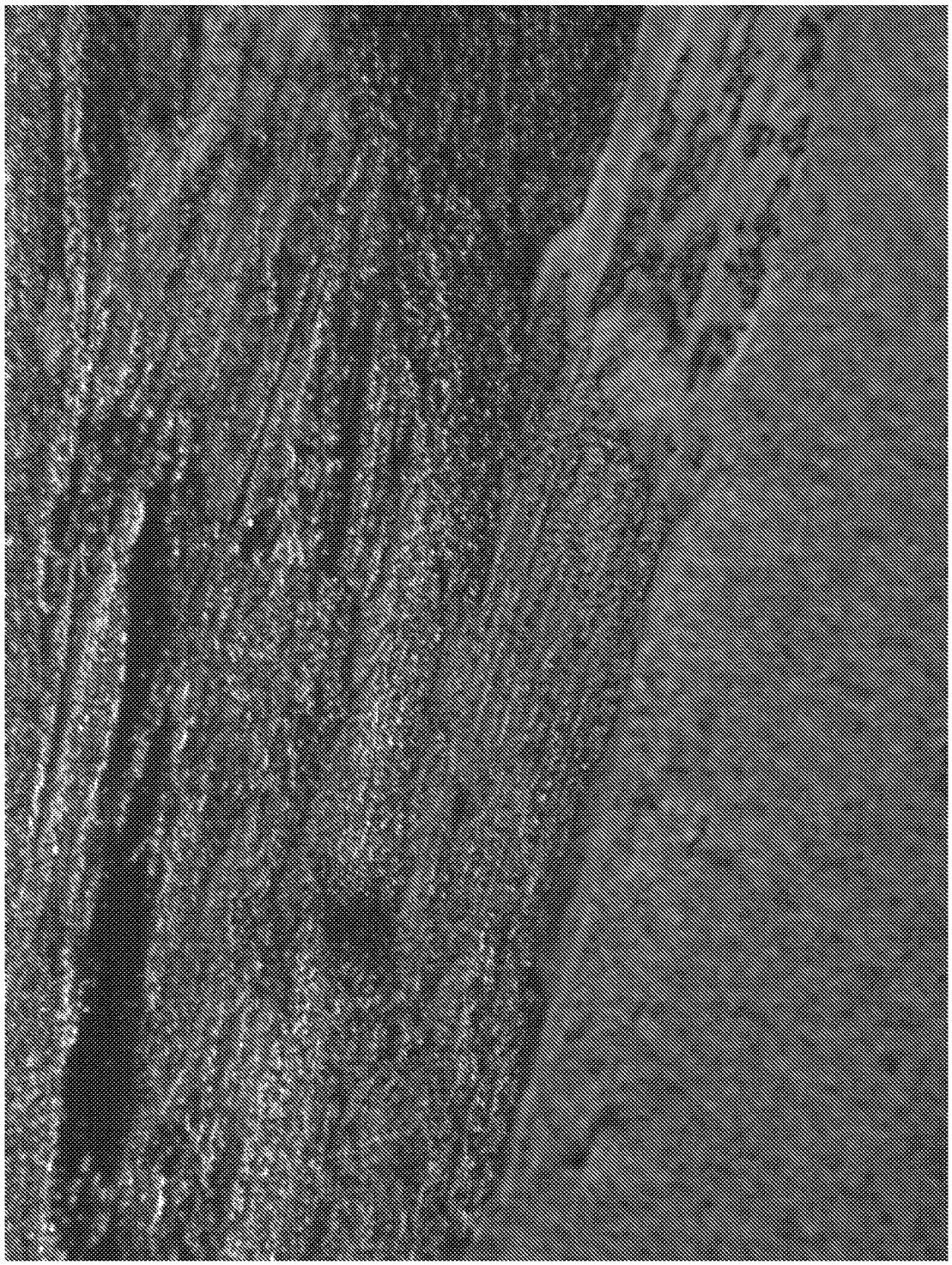
FIG. 2b is a polarized light microscopy image of a chromophore in accordance with an embodiment of the invention after shear alignment exhibiting red shift.
Figure 2C:
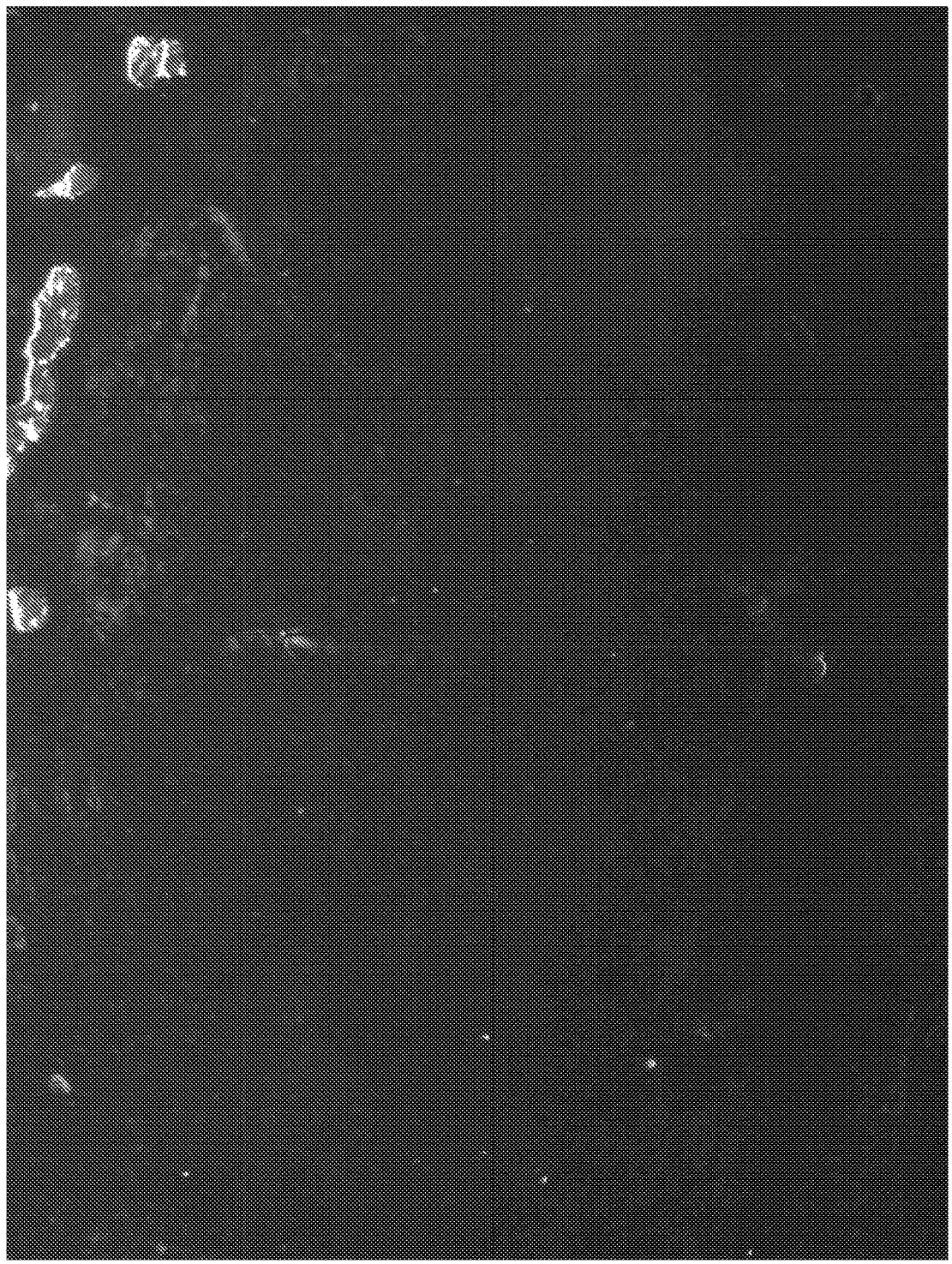
FIG. 2c is a polarized light microscopy image of a chromophore in accordance with an embodiment of the invention after removal of the solvent.

Chromophore 1 was combined with propylene carbonate at 50% by weight forming a lyotropic composition. The composition was placed between two glass substrates and subjected to polarized light microscopy. Referring to FIGS. 2a through 2c, red color was readily observed in a shear aligned sample indicating J-aggregate formation, at least partial self-alignment and anisotropy. FIG. 2c show a sample between two glass substrates prior to shear alignment. Notable micelle formation, evidencing lyotropic properties, is shown. In FIG. 2b, a shear aligned sample evidences clear red color. Such red color evidences J-aggregate formation indicating at least partial self-alignment and anisotropy. FIG. 2c, a sample subjected to heating at 100° C. to remove the solvent shows no red coloration.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An electro-optical film comprising a nonlinear optical chromophore dispersed and poled with an aprotic and polar solvent, wherein the nonlinear optical chromophore is represented by the general formula (I):

$$D-\Pi-A$$

wherein D represents an organic electron-donating group; A represents an organic electron-accepting group having an electron affinity greater than the electron affinity of D; and Π represents a Π-bridge between A and D; wherein the electron-donating group D comprises a tetrahydrocarbazole moiety bound to the Π-bridge at a carbon atom in the tetrahydro six-membered carbon ring of the tetrahydrocarbazole moiety, and wherein the hydrogen bound to the nitrogen of the five-membered ring of the carbazole moiety is replaced with a substituent R, wherein R represents a moiety other than hydrogen.

2. The electro-optical film of claim 1, wherein the tetrahydrocarbazole moiety is represented by the general formula (II):

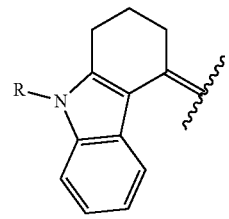

wherein R represents a moiety other than hydrogen.

3. The electro-optical film of claim 2, wherein R represents a moiety comprising an aromatic ring.

4. The electro-optical film of claim 3, wherein R represents a moiety comprising an aromatic ring bearing a triaryl-substituted silyl substituent.

5. The electro-optical film of claim 4, wherein R represents a moiety comprising an aromatic ring bearing a triaryl-substituted silyl substituent presented by general formula (III)

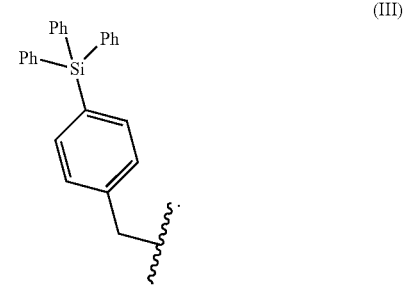

6. The electro-optical film of claim 1, wherein A represents an electron-accepting group of the general formula ($I^a$):

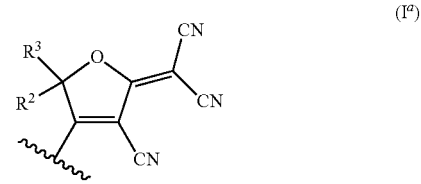

wherein $R^2$ and $R^3$ each independently represents a moiety selected from the group consisting of H, substituted or unsubstituted $C_1$-$C_{10}$ alkyl, substituted or unsubstituted $C_2$-$C_{10}$ alkenyl, substituted or unsubstituted $C_2$-$C_{10}$ alkynyl, substituted or unsubstituted aryl, substituted or unsubstituted alkylaryl, substituted or unsubstituted carbocyclic, substituted or unsubstituted heterocyclic, substituted or unsubstituted cyclohexyl, and $(CH_2)_n$—O—$(CH_2)_n$ where n is 1-10.

7. An electro-optical film of claim 1, wherein the nonlinear optical chromophore is represented by the general formula (IV)

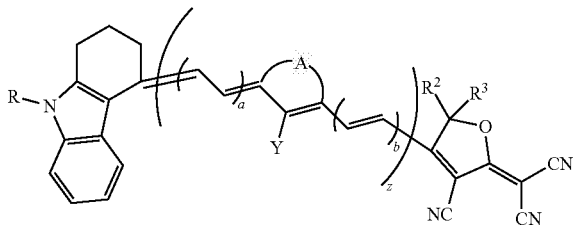
(IV)

wherein R represents a substituent other than hydrogen; wherein $R^2$ and $R^3$ each independently represents a moiety selected from the group consisting of H, substituted or unsubstituted $C_1$-$C_{10}$ alkyl, substituted or unsubstituted $C_2$-$C_{10}$ alkenyl, substituted or unsubstituted $C_2$-$C_{10}$ alkynyl, substituted or unsubstituted aryl, substituted or unsubstituted alkyl-aryl, substituted or unsubstituted carbocyclic, substituted or unsubstituted heterocyclic, substituted or unsubstituted cyclohexyl, and $(CH_2)_n$—O—$(CH_2)_n$ where n is 1-10; wherein each Y independently represents: a hydrogen, a halogen, an alkyl group, aryl group, sulfur or oxygen linked alkyl or aryl group, or a branched or unbranched, optionally heteroatom-containing $C_1$-$C_4$ substituent; wherein each a and b independently represents an integer of 0 to 3; z represents an integer of 1 to 3; and wherein each arc A independently represents a substituted or unsubstituted $C_2$-$C_4$ alkyl group, which together with the carbon bearing the Y substituent and its two adjacent carbon atoms forms a cyclic group.

8. An electro-optic device comprising one or more electro-optical films, wherein each of the one or more electro-optical films comprises a nonlinear optical chromophore dispersed and poled within an aprotic and polar solvent, wherein the nonlinear optical chromophore is represented by the general formula (I):

D-Π-A wherein D represents an organic electron-donating group; A represents an organic electron-accepting group having an electron affinity greater than the electron affinity of D; and Π represents a ø-bridge between A and D; wherein the electron-donating group D comprises a tetrahydrocarbazole moiety bound to the Π-bridge at a carbon atom in the tetrahydro six-membered carbon ring of the tetrahydrocarbazole moiety, and wherein the hydrogen bound to the nitrogen of the five-membered ring of the carbazole moiety is replaced with a substituent R, wherein R represents a moiety other than hydrogen.

9. The electro-optic device of claim 8, wherein the tetrahydrocarbazole moiety is represented by the general formula (II):

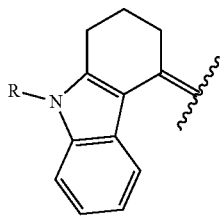
(II)

wherein R represents a moiety other than hydrogen.

10. The electro-optic device of claim 9, wherein R represents a moiety comprising an aromatic ring.

11. The electro-optic device of claim 10, wherein R represents a moiety comprising an aromatic ring bearing a triaryl-substituted silyl substituent.

12. The electro-optic device of claim 11, wherein R represents a moiety comprising an aromatic ring bearing a triaryl-substituted silyl substituent presented by general formula (III)

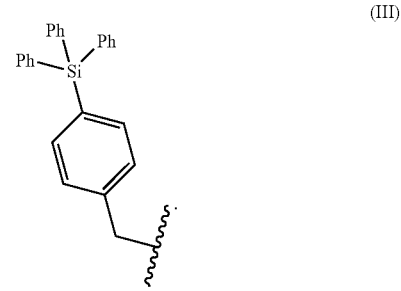
(III)

13. The electro-optic device of claim 8, wherein A represents an electron-accepting group of the general formula (I$^a$):

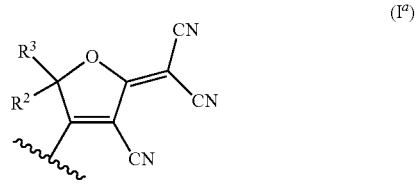
(I$^a$)

wherein $R^2$ and $R^3$ each independently represents a moiety selected from the group consisting of H, substituted or unsubstituted $C_1$-$C_{10}$ alkyl, substituted or unsubstituted $C_2$-$C_{10}$ alkenyl, substituted or unsubstituted $C_2$-$C_{10}$ alkynyl, substituted or unsubstituted aryl, substituted or unsubstituted alkylaryl, substituted or unsubstituted carbocyclic, substituted or unsubstituted heterocyclic, substituted or unsubstituted cyclohexyl, and $(CH_2)_n$—O—$(CH_2)_n$ where n is 1-10.

14. The electro-optic device of claim 8, wherein the nonlinear optical chromophore is represented by the general formula (IV)

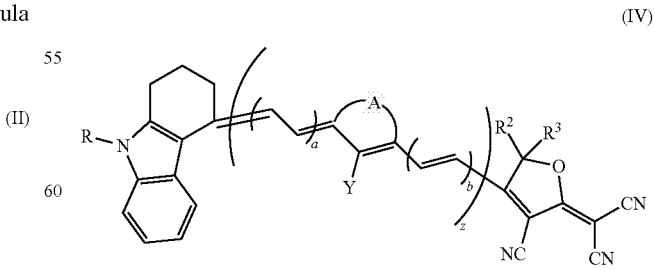
(IV)

wherein R represents a substituent other than hydrogen; wherein $R^2$ and $R^3$ each independently represents a moiety selected from the group consisting of H, substituted or unsubstituted $C_1$-$C_{10}$ alkyl, substituted or unsubstituted $C_2$-$C_{10}$ alkenyl, substituted or unsubstituted $C_2$-$C_{10}$ alkynyl, substituted or unsubstituted aryl, substituted or unsubstituted alkyl-aryl, substituted or unsubstituted carbocyclic, substituted or unsubstituted heterocyclic, substituted or unsubstituted cyclohexyl, and $(CH_2)_n$—O—$(CH_2)_n$ where n is 1-10; wherein each Y independently represents: a hydrogen, a halogen, an alkyl group, aryl group, sulfur or oxygen linked alkyl or aryl group, or a branched or unbranched, optionally heteroatom-containing $C_1$-$C_4$ substituent; wherein each a and b independently represents an integer of 0 to 3; z represents an integer of 1 to 3; and wherein each arc A independently represents a substituted or unsubstituted $C_2$-$C_4$ alkyl group, which together with the carbon bearing the Y substituent and its two adjacent carbon atoms forms a cyclic group.

* * * * *